(12) United States Patent
Tu et al.

(10) Patent No.: US 12,358,381 B2
(45) Date of Patent: Jul. 15, 2025

(54) METHOD FOR PREDICTING ENERGY CONSUMPTION-RECOVERY RATIO OF NEW ENERGY VEHICLE, AND ENERGY SAVING CONTROL METHOD AND SYSTEM FOR NEW ENERGY VEHICLE

(71) Applicant: Xiamen Yaxon Zhilian Technology Co., Ltd., Fujian (CN)

(72) Inventors: Yankai Tu, Fujian (CN); Junfang Lai, Fujian (CN)

(73) Assignee: Xiamen Yaxon Zhilian Technology Co., Ltd., Fujian (CN)

(*) Notice: Subject to any disclaimer, the term of this patent is extended or adjusted under 35 U.S.C. 154(b) by 229 days.

(21) Appl. No.: 18/020,101

(22) PCT Filed: Jul. 23, 2021

(86) PCT No.: PCT/CN2021/108013
§ 371 (c)(1),
(2) Date: Feb. 7, 2023

(87) PCT Pub. No.: WO2022/028257
PCT Pub. Date: Feb. 10, 2022

(65) Prior Publication Data
US 2023/0264578 A1      Aug. 24, 2023

(30) Foreign Application Priority Data
Aug. 7, 2020   (CN) .......................... 202010790881.7

(51) Int. Cl.
*B60L 50/60*   (2019.01)
*B60L 3/12*   (2006.01)
(52) U.S. Cl.
CPC ................. *B60L 50/60* (2019.02); *B60L 3/12* (2013.01); *B60L 2260/54* (2013.01)

(58) Field of Classification Search
CPC ........ B60L 15/2045; B60L 3/12; B60L 50/40; B60L 50/60; B60L 50/61; B60L 58/10;
(Continued)

(56) References Cited

U.S. PATENT DOCUMENTS

2014/0277835 A1* 9/2014 Filev .................. G01C 21/3469
701/2
2014/0288749 A1* 9/2014 Dumrongkietiman ......................
B60L 50/62
701/22

(Continued)

FOREIGN PATENT DOCUMENTS

| CN | 104627185 A | 5/2015 |
|---|---|---|
| CN | 110610260 A | 12/2019 |

(Continued)

OTHER PUBLICATIONS

International Search Report cited in PCT/CN2021/108013 mailed Oct. 27, 2021, 6 pages.
Written Opinion cited in PCT/CN2021/108013 mailed Oct. 27, 2021, 7 pages.

*Primary Examiner* — Dale W Hilgendorf
*Assistant Examiner* — Frank T Glenn, III
(74) *Attorney, Agent, or Firm* — Cooper Legal Group, LLC

(57) ABSTRACT

Provided are a method for predicting an energy consumption-recovery ratio of a new energy vehicle, and an energy saving control method and system for the new energy vehicle. The method includes: (1) acquiring, by means of an electronic horizon system, geographic information data of a position that is K meters ahead on a road from a current position of the new energy vehicle; (2) compiling statistics on speed information during the process of the new energy vehicle traveling S meters to reach the current position, values of K and S being the same; and (3) taking the geographic information data and the speed information as
(Continued)

input vectors, inputting the same into a trained artificial neural network, and outputting a predicted energy consumption-recovery ratio. The present disclosure can optimize energy control over the vehicle, improve the utilization rate of electrical energy, and increase the traveling mileage.

8 Claims, 2 Drawing Sheets

(58) Field of Classification Search
CPC .............. B60L 7/10; B60L 2240/421; B60L 2260/46; B60L 2260/54; B60W 20/11; B60W 20/12; B60W 20/14; B60W 30/18127; B60W 50/0097; B60W 10/26; B60W 2520/10; B60W 2552/20; B60W 2554/406; B60W 2556/10; B60W 2556/40; B60W 2556/50; G06N 3/04; G06N 3/044; G06N 3/08; Y02T 10/70; Y02T 10/84
See application file for complete search history.

(56) References Cited

U.S. PATENT DOCUMENTS

| | | | |
|---|---|---|---|
| 2015/0073637 A1* | 3/2015 | Lennevi ............ | B60W 50/0097 701/22 |
| 2016/0016476 A1* | 1/2016 | Lovshin ................ | H02K 53/00 74/DIG. 9 |
| 2017/0282737 A1* | 10/2017 | Miller ................... | B60W 10/06 |
| 2018/0029516 A1* | 2/2018 | Chelian ................ | B60P 1/5404 |
| 2019/0308510 A1* | 10/2019 | Beaurepaire .......... | B60K 35/60 |
| 2019/0383876 A1* | 12/2019 | Gray .................... | G01R 31/392 |
| 2021/0088347 A1* | 3/2021 | Matsumura ............ | G01C 21/20 |
| 2021/0287297 A1* | 9/2021 | Hayward ............... | G10L 15/26 |

FOREIGN PATENT DOCUMENTS

| | | |
|---|---|---|
| CN | 110936947 A | 3/2020 |
| CN | 111204327 A | 5/2020 |
| JP | 2018150018 A | 9/2018 |

* cited by examiner

METHOD FOR PREDICTING ENERGY CONSUMPTION-RECOVERY RATIO OF NEW ENERGY VEHICLE, AND ENERGY SAVING CONTROL METHOD AND SYSTEM FOR NEW ENERGY VEHICLE

TECHNICAL FIELD

The present invention relates to the technical field of new energy vehicles, in particular to a method for predicting an energy consumption-recovery ratio of a new energy vehicle, and an energy saving control method and system for the new energy vehicle.

BACKGROUND

New energy vehicles (pure electric vehicles or hybrid vehicles) may not only rely on energy storage elements such as batteries to output energy for vehicle traveling, but also rely on vehicle braking or coasting to recover energy to the energy storage elements, which have higher energy economic efficiency than traditional vehicles. Braking energy recovery includes both coasting feedback energy recovery by releasing an accelerator pedal and braking energy recovery by applying a brake pedal. Through the braking energy recovery technology, excess energy released from an electric vehicle during braking or inertial coasting is converted into electrical energy and then stored in a battery of the EV, so that the released excess energy may be recycled to provide driving energy for subsequent traveling of the EV. Therefore, braking energy recovery is of great importance to improving the energy utilization of electric vehicles.

At present, there are many complex situations affecting the energy consumption and recovery of new energy vehicles, including road slope, traffic signs, traffic flow congestion, road curvature, intersections, etc. Therefore, it is difficult to predict the energy consumption and recovery of vehicles by simple determination of external conditions. At the same time, besides the external objective environment, the energy consumption and recovery of a vehicle are closely related to the configuration, performance and even driving characteristics of the vehicle. Therefore, to accurately predict the energy consumption and recovery of the vehicle, it is not possible to make a simple logical determination with external conditions.

Therefore, studying the energy consumption and energy recovery law of new energy vehicles under different terrains, road conditions, traffic environment and other conditions, and being able to make accurate predictions have positive effects on optimizing energy control over vehicles, improving the utilization rate of electrical energy, increasing the traveling mileage and optimizing the driving comfort.

SUMMARY

In order to solve the technical problems in the prior art, the present invention provides a method for predicting an energy consumption-recovery ratio of a new energy vehicle, and an energy saving control method and system for the new energy vehicle, which have positive effects on optimizing energy control over the vehicle, improving the utilization rate of electrical energy and increasing the traveling mileage.

The technical solutions used in the present invention to solve the technical problems are as follows: a method for predicting an energy consumption-recovery ratio of a new energy vehicle includes the following steps:

(1) acquiring, by means of an electronic horizon system, geographic information data of a position that is K meters ahead on a road from a current position of the new energy vehicle;

(2) compiling statistics on speed information during the process of the new energy vehicle traveling S meters to reach the current position, values of K and S being the same; and (3) taking the geographic information data and the speed information as input vectors, inputting the geographic information data and the speed information into a trained artificial neural network, and outputting a predicted energy consumption-recovery ratio.

As a preferred solution of the present invention, the trained artificial neural network is trained according to the following training method:

(3.1) acquiring, by means of the electronic horizon system, the geographic information data of the position that is K meters ahead on the road;

(3.2) while the new energy vehicle travels within the K meters, compiling statistics on energy consumption and energy recovery and performing calculation to obtain an energy consumption-recovery ratio P, and acquiring the speed information;

(3.3) taking the geographic information data and the speed information as input vectors, and inputting the geographic information data and the speed information into a preset artificial neural network for training, an output vector being the predicted energy consumption-recovery ratio P'; and (3.4) calculating a loss function based on the energy consumption-recovery ratio P and the predicted energy consumption-recovery ratio P', modifying weights of nodes in intermediate layers of the preset artificial neural network, and then returning to step (3.1) to continue training until the preset artificial neural network converges.

As a preferred solution of the present invention, the preset artificial neural network is an error feedback neural network.

As a preferred solution of the present invention, if the geographic information data includes N types of data, and a resolution of each type of data is T meters, a one-dimensional input vector including $N*K/T+4$ elements is established, each type of data is written into the one-dimensional input vector in an order of the vehicle from near to far, and the speed information includes a minimum speed, a maximum speed, an average speed and a speed standard deviation and serves as the last four elements of the one-dimensional input vector.

According to an energy saving control method for a new energy vehicle, in the traveling process of the new energy vehicle, an energy consumption-recovery ratio of a position that is K meters ahead on a road from a current position is predicted by using the above method for predicting the energy consumption-recovery ratio of the new energy vehicle, and energy saving control is performed based on the energy consumption-recovery ratio.

As a preferred solution of the present invention, in the case that the energy consumption-recovery ratio is less than a preset threshold, a hybrid vehicle is controlled to firstly consume energy in an energy storage medium that is easy for energy recovery.

As a preferred solution of the present invention, in the case that the energy consumption-recovery ratio is less than a preset threshold, a hybrid vehicle using a diesel engine and a battery is controlled to switch to a pure electric mode for traveling, or increases an electrical output ratio.

As a preferred solution of the present invention, in the case that the energy consumption-recovery ratio is less than a preset threshold, a hybrid vehicle using a battery and a super-capacitor is controlled to switch to super-capacitor output, or increases a super-capacitor output ratio.

As a preferred solution of the present invention, the energy storage medium includes a power battery, a super-capacitor or a hydraulic energy storage tank.

An energy saving control system for a new energy vehicle includes:

a geographic information data acquisition apparatus, configured to acquire, from an electronic horizon system, geographic information data of a position that is K meters ahead on a road from a current position of the new energy vehicle;

a speed information acquisition apparatus, configured to read speed information during the process of the vehicle traveling S meters to reach the current position, values of K and S being the same;

an energy consumption-recovery ratio prediction apparatus, configured to take the geographic information data and the speed information as input vectors, to input the geographic information data and the speed information into a trained artificial neural network, and to output a predicted energy consumption-recovery ratio; and an energy saving control apparatus, configured to perform energy saving control over the new energy vehicle based on the energy consumption-recovery ratio.

By means of the above technical solution, compared with the prior art, the present invention has the following beneficial effects:

1. The prediction method of the present invention proposes the definition of the energy consumption-recovery ratio, acquires the geographic information data of a road ahead by means of the electronic horizon system, and inputs the geographic information data and the speed information into the trained artificial neural network to obtain the predicted energy consumption-recovery ratio. The method is used for predictive vehicle optimization control of the new energy vehicle, and has a more economical effect compared with traditional real-time control.

2. By means of the prediction method of the present invention, dynamic training in the traveling process of the vehicle is performed with formatted information of a road segment environment ahead of the vehicle provided by the electronic horizon system and the speed information subjected to compiling statistics after the vehicle ends traveling on the road segment as input of the artificial neural network, and the energy consumption-recovery ratio subjected to compiling statistics after the vehicle ends traveling on the road segment as output of the artificial neural network, a convergent neural network is obtained, the prediction accuracy is improved, and the method has the advantages of self-adaption, self-organization and real-time learning.

3. By means of the control method and system according to the present invention, energy saving control is performed based on the predicted energy consumption-recovery ratio, which can improve the utilization rate of electrical energy, increase the traveling mileage, etc.

4. By means of the control method and system according to the present invention, by comparing the energy consumption-recovery ratio with the preset threshold, whether to control the vehicle to consume the energy in the energy storage medium which is able to easily recover energy first is determined, such that after reaching the condition ahead, the battery has more space to recover energy. The determination method is simple and easy to implement.

DESCRIPTION OF EMBODIMENTS

The technical solutions of the present invention are described in detail below in conjunction with the accompanying drawings and embodiments.

Embodiments

A method for predicting an energy consumption-recovery ratio of a new energy vehicle defines the energy consumption-recovery ratio, which is a ratio of energy consumed to energy recovered on a road segment by an energy storage medium, as a vehicle traveling driver, of the new energy vehicle, that is, $P=Pw/Pr$. Pw is energy consumption and Pr is the amount of energy recovery, which may be measured from relevant energy devices on the vehicle. For example, the amount of energy output and the amount of energy recovery of a battery are calculated based on input or output currents and voltages of the battery. The energy storage medium includes, but is not limited to, a power battery, a super-capacitor, a hydraulic energy storage tank, and other well-known components.

Figure 1:
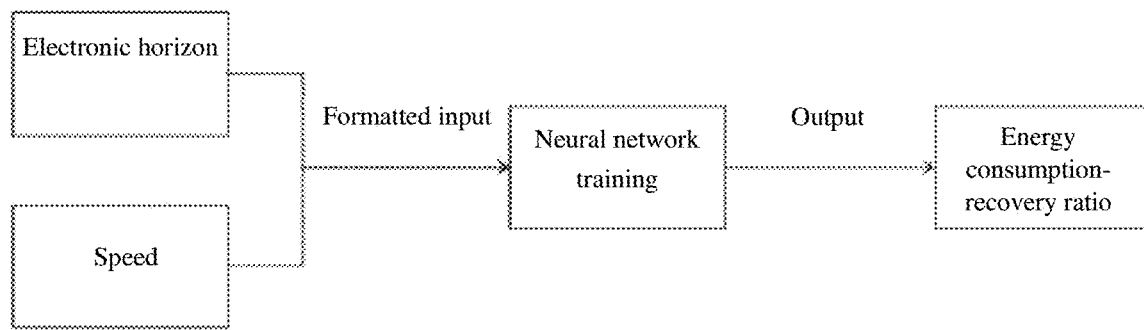
FIG. 1 shows a diagram of a method according to the present invention.

Referring to FIG. 1, a method for predicting an energy consumption-recovery ratio of a new energy vehicle according to the present invention includes the following steps:

(1) Acquire, by means of an electronic horizon system, geographic information data of a position that is K meters ahead on a road from a current vehicle position of the new energy vehicle. Electronic horizon technology relies on high-precision map data and GPS signals to provide vehicles with accurate information about a road ahead, allowing the vehicles to have the capacity to predict road conditions ahead. Electronic horizon technology may provide predictable road information for vehicle dynamics and other electronic controls.

Figure 2:
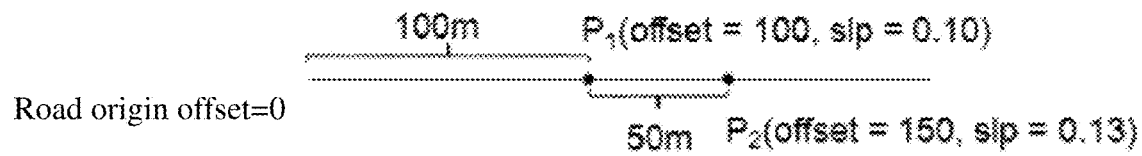
FIG. 2 shows a schematic diagram of slope points of geographic information data according to the present invention.

The data provided by the electronic horizon is converted into a form of numerical values combined with road offsets. For example, slope ahead data output by the electronic horizon is slope points that establish a relation with a road offset value (the offset value is a distance in meters to travel relative to a road origin). Referring to two slope points P1 and P2 shown in FIG. 2, the slopes P1 and P2 are represented in the electronic horizon as an offset value from the road origin and a corresponding slope value slp. The slope of the road ahead broadcast by the electronic horizon is a string of slope points at successive equal intervals of T meters (e.g., at an interval of 5 meters). The road curvature, degree of congestion, speed limit, etc. are also similar to the slope, and are formed by a series of values combined with position offsets.

(2) Compile statistics on speed information during the process of the new energy vehicle traveling S meters to reach the current vehicle position. That is, S meters is a distance by which the vehicle has traveled currently, and K meters in step (1) is a distance by which the vehicle has not traveled currently and is about to travel. Values of S and K are the same.

(3) Take the geographic information data and the speed information as input vectors, input the geographic information data and the speed information into a trained artificial neural network, and output a predicted energy consumption-recovery ratio. The trained artificial neural network according to the present invention is an error feedback neural network, such as a BP neural network or a deep learning CNN network. Other known artificial neural networks may also be used.

In the present invention, data output by the electronic horizon system may be arranged in the original format of the electronic horizon data of K/T meters ahead as an input vector of the neural network. Since the electronic horizon system may generally predict a road distance of 8000 meters ahead, K is, but not limited to, 8000. K may also be increased or decreased according to the hardware computing capability of an apparatus that undertakes a neural network training algorithm.

Therefore, if the geographic information data includes N types of data, and a resolution (interval) of each type of data is T meters, a one-dimensional input vector including N*K/T+4 elements is established, and each type of data is written into the one-dimensional input vector in an order of the vehicle from near to far. The speed information includes Vmin denoting a minimum speed of the vehicle traveling within the distance of K meters, Vmax denoting a maximum speed of the vehicle, Vave denoting an average speed, and D denoting a speed standard deviation. The minimum speed, the maximum speed, the average speed and the speed standard deviation serve as the last four elements, and are calculated and ranked after the vehicle travels K meters.

Figure 3:
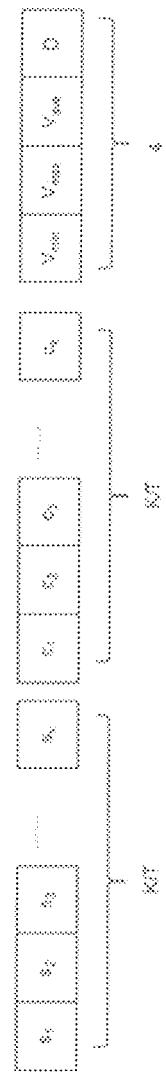
FIG. 3 shows a schematic diagram of a one-dimensional input vector according to the present invention.

For example, suppose that for a simplified electronic horizon system, the data interval T=5, if only the slope(s) and the traffic congestion degree (c) of K meters ahead on the road are acquired, a one-dimensional input vector of 2*K/T+4 is established. As shown in FIG. 3, all slope point values s ahead are ranked into the input vector from near to far relative to the vehicle, and then all the traffic congestion degree values c are ranked into the input vector from near to far relative to the vehicle. All information that may be output from the electronic horizon may be arranged in this format and input into the neural network. The last four elements of the vector are the speed information.

The trained artificial neural network according to the present invention is trained according to the following training method:

(3.1) Acquire, by means of the electronic horizon system, the geographic information data of the position that is K meters ahead on the road. If the geographic information data includes N types of data, and the resolution (interval) of each type of data is T meters, the one-dimensional input vector including N*K/T+4 elements is established.

(3.2) While the vehicle travels within the K meters, compile statistics on energy consumption and an energy recovery amount and perform calculation to obtain an energy consumption-recovery ratio P, and acquire the speed information. The vehicle traveling within the K meters indicates the vehicle traveling within the K meters ahead on the road in step (3.1).

(3.3) Take the geographic information data and the speed information as input vectors, and input the geographic information data and the speed information into an artificial neural network for training, an output vector being the predicted energy consumption-recovery ratio P'. Specifically, a first type of electronic horizon data is written into the one-dimensional vector in the order from near to far relative to the vehicle, and then the next type of geographic information data is written until all types of data are written into the one-dimensional vector. The speed information, including the minimum speed Vmin, the maximum speed Vmax, the average speed Vave and the speed standard deviation D, is written as the last four elements of the one-dimensional input vector. The input vector of the neural network is one-dimensional input including N*K/T+4 elements, and the output of the neural network is one-dimensional output which represents the predicted energy consumption-recovery ratio P'.

(3.4) Calculate a loss function based on the energy consumption-recovery ratio P and the predicted energy consumption-recovery ratio P', modify weights of nodes in intermediate layers of the artificial neural network, and return to step (3.1) to continue training until the artificial neural network converges.

Specifically, the loss function of the neural network is chosen in terms of the applicability of the selected neural network. For example, for the BP neural network, a cross-entropy loss function is generally chosen.

$$E=-(P' \ln P+(1-P')\ln(1-P)).$$

For other neural networks, a loss function that is well known in engineering for the neural network may be selected for calculation. Upon completion of the loss function, the weights of the nodes in the intermediate layers of the neural network are modified using a known error modification method of the neural network, thus completing one training.

The energy consumption-recovery ratio according to the present invention may be used as a core parameter for optimization control over new energy vehicles to control and optimize the energy distribution or output of the vehicles, so that the energy control of the new energy vehicles features predictive optimization based on the energy consumption-recovery ratio ahead, and the economic efficiency, traveling mileage and other performance of the new energy vehicles are improved.

Therefore, the present invention further provides an energy saving control method for a new energy vehicle. In the traveling process of the new energy vehicle, an energy consumption-recovery ratio of a position that is K meters ahead on a road is predicted by using the above method for predicting the energy consumption-recovery ratio of the new energy vehicle, and energy saving control is performed based on the energy consumption-recovery ratio. Specifically, for a hybrid vehicle, in the case that the energy consumption-recovery ratio is less than a preset threshold, which indicates that for the vehicle, there is more energy to recover within K meters ahead, the vehicle is controlled to first consume energy in an energy storage medium that is easy for energy recovery.

For example, for a hybrid vehicle using a diesel engine and a battery, since the battery is a storage medium that may recover energy compared with the diesel engine, in the case that the energy consumption-recovery ratio is less than the preset threshold, the vehicle is controlled to switch to a pure electric mode for traveling, or increases an electrical output ratio in new energy to consume power of the battery first. In this way, after reaching the condition ahead, the battery has more space to recover energy.

For a hybrid vehicle using a battery and a super-capacitor, since the super-capacitor has higher energy recovery efficiency and recovers energy more easily, in the case that the energy consumption-recovery ratio is less than the preset threshold, the vehicle is controlled to switch to super-capacitor output, or increases a super-capacitor output ratio to consume power of the super-capacitor first. In this way, after reaching the condition ahead, the super-capacitor may have more space to recover energy.

According to the present invention, the threshold may be determined in a variety of ways that are readily conceivable in engineering. For example, large samples are collected to determine a reasonable threshold, or the threshold is selected directly from empirical values.

The present invention further provides an energy saving control system for a new energy vehicle. The system includes:

a geographic information data acquisition apparatus, configured to acquire, from an electronic horizon system, geographic information data of a position that is K meters ahead on a road from a current position of the new energy vehicle;

a speed information acquisition apparatus, configured to read speed information during the process of the new energy vehicle traveling S meters to reach the current position, values of K and S being the same;

an energy consumption-recovery ratio prediction apparatus, configured to take the geographic information data and the speed information as input vectors, to input the geographic information data and the speed into a trained artificial neural network, and to output a predicted energy consumption-recovery ratio; and an energy saving control apparatus, configured to perform energy saving control over the new energy vehicle based on the energy consumption-recovery ratio.

The methods and the system according to the present invention perform training and learning and predict the energy consumption-recovery ratio ahead based on electronic horizon data, and may be used for predictive vehicle optimization control of new energy vehicles. Compared with traditional real-time control, the predictive learning and control based on the electronic horizon data ahead according to the present invention may achieve a more economical control effect.

The foregoing are merely preferred embodiments of the present invention and are not intended to limit the present invention in any way. Although the present invention has been described with reference to the preferred embodiments, it is not intended to be limited thereto. Any person skilled in the art, without departing from the scope of the technical solutions of the present invention, may make many possible variations and modifications to the technical solutions of the present invention based on the technical content disclosed above, or modify it to equivalent embodiments. Therefore, any simple modifications, equivalent changes and modifications of the above embodiments in accordance with the technical substance of the present invention without departing from the technical solutions of the present invention shall fall within the scope of protection of the technical solutions of the present invention.

INDUSTRIAL APPLICABILITY

The method for predicting the energy consumption-recovery ratio of the new energy vehicle, and the energy saving control method and system for the new energy vehicle according to the present invention obtain the geographic information data of the road ahead by means of the electronic horizon system, input the geographic information data and the speed information into the trained artificial neural network to obtain the predicted energy consumption-recovery ratio, and are used for predictive vehicle optimization control of the new energy vehicle. The electronic horizon system is a kind of database system that may provide the vehicle with accurate real-time information of the road ahead. By means of the electronic horizon system, various kinds of dynamic data such as speed limit information, traffic lights, construction sites and obstacles as well as actual road data of the road ahead may be acquired. The artificial neural network abstracts the human brain neuron network from the perspective of information processing, establishes some kind of simple model and form different networks according to different connections. The neural network is a kind of computing model, including a large number of nodes (or neurons) interconnected with each other. The present invention is easy to implement in industry by means of the electronic horizon system and the artificial neural network, and various components such as the diesel engine, the battery, the super-capacitor and the hydraulic energy storage tank are also easy to process in industry.

The invention claimed is:

1. A method for predicting an energy consumption-recovery ratio of a new energy vehicle, comprising the following steps:
   (1) acquiring, by means of an electronic horizon system, geographic information data of a position that is K meters ahead on a road from a current position of the new energy vehicle;
   (2) compiling statistics on speed information during a process of the new energy vehicle traveling S meters to reach the current position, values of K and S being the same; and
   (3) taking the geographic information data and the speed information as input vectors, inputting the geographic information data and the speed information into a trained artificial neural network, and outputting a predicted energy consumption-recovery ratio (P');
   wherein when the geographic information data comprises N types of data, a resolution of each type of data is T meters, a one-dimensional input vector comprising $N*K/T+4$ elements is established, each type of data is written into the one-dimensional input vector in an order of the new energy vehicle from near to far with respect to the position that is K meters ahead on the road from the current position of the new energy vehicle, and the speed information comprises a minimum speed, a maximum speed, an average speed and a speed standard deviation and serves as a last four elements of the one-dimensional input vector.

2. The method for predicting an energy consumption-recovery ratio of a new energy vehicle according to claim 1, wherein the trained artificial neural network is trained according to the following training method:
   (3.1) acquiring, by means of the electronic horizon system, the geographic information data of the position that is K meters ahead on the road;
   (3.2) while the new energy vehicle travels within the K meters, compiling statistics on energy consumption and energy recovery and performing calculation to obtain an energy consumption-recovery ratio (P), and acquiring the speed information;
   (3.3) taking the geographic information data and the speed information as the input vectors, and inputting the geographic information data and the speed information into a preset artificial neural network for training, an output vector being the predicted energy consumption-recovery ratio (P'); and
   (3.4) calculating a loss function based on the energy consumption-recovery ratio (P) and the predicted energy consumption-recovery ratio (P'), modifying weights of nodes in intermediate layers of the preset artificial neural network.

3. The method for predicting an energy consumption-recovery ratio of a new energy vehicle according to claim 2, wherein the preset artificial neural network is an error feedback neural network.

4. An energy saving control method for a new energy vehicle adopting the method for predicting an energy consumption-recovery ratio of a new energy vehicle according to claim 1, wherein in a traveling process of the new energy vehicle, the predicted energy consumption-recovery ratio (P') of the position that is K meters ahead on the road from the current position is predicted, and energy saving control is performed based on the predicted energy consumption-recovery ratio (P').

5. The energy saving control method for a new energy vehicle according to claim 4, wherein in the case that the predicted energy consumption-recovery ratio (P') is less than a preset threshold, a hybrid vehicle is controlled to firstly consume energy in a specified energy storage medium.

6. The energy saving control method for a new energy vehicle according to claim 5, wherein the specified energy storage medium comprises a power battery, a super-capacitor or a hydraulic energy storage tank.

7. The energy saving control method for a new energy vehicle according to claim 4, wherein in the case that the predicted energy consumption-recovery ratio (P') is less than a preset threshold, a hybrid vehicle using a diesel engine and a battery is controlled to switch to a pure electric mode for traveling, or to increase an electrical output ratio.

8. The energy saving control method for a new energy vehicle according to claim 4, wherein in the case that the predicted energy consumption-recovery ratio (P') is less than a preset threshold, a hybrid vehicle using a battery and a super-capacitor is controlled to switch to super-capacitor output, or to increase a super-capacitor output ratio.

* * * * *